Patented Feb. 4, 1947

2,415,295

UNITED STATES PATENT OFFICE 2,415,295

PREPARATION OF 2-CHLOROBUTADIENE-1,3

Oliver W. Cass, Niagara Falls, N. Y., assignor to E. I. du Pont de Nemours & Company, Wilmington, Del., a corporation of Delaware No Drawing. Application May 22, 1940, Serial No. 336,627

3 Claims. (Cl. 260—655)

This invention relates to the preparation of 2-chlorobutadiene-1,3 and more particularly to the preparation of this compound by a method involving the vapor phase pyrolysis of products obtained by chlorinating 2-chlorobutene-2.

2-chlorobutadiene-1,3 is a colorless liquid having an atmospheric boiling point of 59.4° C. The copending application of Levine and Cass, Serial No. 336,625, filed May 22, 1940, describes the vapor phase cracking of products obtained by chlorinating 2-chlorobutene-2 so as to obtain 2-chlorobutadiene-1,3 as substantially the sole monochlorobutadiene. In that copending application the use of certain catalysts such as salts of alkaline earth metals is disclosed. The present application relates to the catalytic vapor phase pyrolysis of compounds obtained by chlorinating 2-chlorobutene-2 and involves the use of a particularly improved type of catalyst for effecting the pyrolysis of such compounds to 2-chlorobutadiene-1,3.

It is an object of this invention to provide an improved method for preparing 2-chlorobutadiene-1,3. A further object is the provision of improved catalysts for use in effecting the vapor phase pyrolysis of compounds which are obtained by chlorinating 2-chlorobutene-2 so as to obtain 2-chlorobutadiene-1,3 in good yields. These and still further objects will be apparent from the following description of our invention.

The above objects may be accomplished in accordance with this invention by subjecting products which are obtained by chlorinating 2-chlorobutene-2 to pyrolysis in the vapor phase in the presence of a catalyst selected from the group consisting of metallic copper and copper compounds. When 2-chlorobutene-2 is chlorinated either in the liquid or vapor phase, for example, at temperatures ranging from 0 to 125° C., products are obtained which may be readily converted to 2-chlorobutadiene-1,3. These products include 2,2,3-trichlorobutane and two isomeric dichlorobutenes boiling at temperatures of 111 to 112° C. and 130 to 131° C. Any of these three compounds or mixtures thereof when pyrolyzed in the vapor phase yields 2-chlorobutadiene-1,3 in substantial amounts. It has been discovered that by effecting such pyrolysis in the presence of copper or a copper compound, improved yields of 2-chlorobutadiene-1,3 results, which compound is obtained as substantially the only monochlorobutadiene reaction product.

In using metallic copper or copper compounds, such as copper oxide, copper chloride, and the like, as catalysts for effecting the vapor phase pyrolysis of the above mentioned products, vapors of such products, either alone or in the presence of diluent materials such as steam, nitrogen and the like, may be passed over the catalyst. The use of diluent materials such as steam does not appear to be particularly advantageous since excellent results may be obtained using the present catalyst in the absence of steam. Pyrolysis may be effected at temperatures over a wide range e. g. from about 300° C. up to temperatures at which 2-chlorobutadiene-1,3 is decomposed at an excessive rate. As a general matter operation within the temperature range 400 to 600° C. has been found to produce good results, the temperature range of 470 to 520° C. being preferred.

The 2,2,3-trichlorobutane which may be used as a starting material in practicing the present method is a compound having an atmospheric boiling point of 141.6° to 142.8° C. and a density of $$1.2672 \tfrac{20}{4}$$

The two isomeric dichlorobutenes which may be used as raw materials include a dichlorobutene boiling at 111 to 112° C. and having a density of $$1.1380 \tfrac{20}{4}$$

and a second dichlorobutene boiling at 130 to 131° C. and having a density of $$1.173 \tfrac{20}{4}$$

These isomeric dichlorobutenes are believed to be 2,3-dichlorobutenes, probably isomers of 2,3-dichlorobutene-2. The preparation of these three compounds is described in the copending application of Levine and Cass, Serial No. 336,624, filed May 22, 1940. That application describes a method involving the liquid phase chlorination of 2-chlorobutene-2, preferably in the presence of a catalyst such as ferric chloride or stannic chloride, whereby mixtures of the compounds are readily obtained. Suitable mixtures of the compounds may also be obtained by chlorinating 2-chlorobutene-2 in the vapor phase at a temperature ranging from the boiling point of 2-chlorobutene-2 to 125° C., a temperature of about 100 to 125° C. being preferred. The liquid phase chlorination may also be effected in the presence of actinic light to give suitable mixtures of the above compounds as described in the copending application of Cass and K'Burg, Serial No. 336,626, filed May 22, 1940.

Any one of the above mentioned three compounds may be pyrolyzed in accordance with the present invention to obtain 2-chlorobutadiene-1,3, or mixtures of any two or more of the compounds may be used. When the methods described in the aforementioned copending applications are used in preparing the compounds, they are generally obtained in the form of a mixture of all three compounds although in some instances, e. g. when employing stannic chloride as catalyst in the liquid phase, the amount of dichlorobutene boiling at 130 to 131° is small.

The following example further illustrates the present invention.

*Example*

A copper, multiple-tube reactor was used for effecting the pyrolysis. The reactor consisted of nine sections of copper tubing each section being 0.5 inch in diameter and 2.5 feet long, the sections being placed together so that the vapors of the material being pyrolyzed passed through the furnace nine times. The reactor was enclosed in an electrically heated furnace and was maintained during the course of the run at a temperature of 485 to 490° C. The material to be pyrolyzed was fed at a uniform and measured rate into a copper coil vaporizer or preheater maintained at a temperature of 225° C. and from there the vapors were passed directly into the copper, multiple-tube reactor. Gaseous products from the reactor were passed to a cold water condenser provided with a receiver. Gases not liquified by the condenser were passed through water scrubbers for removing hydrogen chloride, through a calcium chloride drier and then to a final low temperature condenser. Products isolated in the two condensers and in the water scrubbers were combined and subjected to steam distillation. The crude product obtained was dried and then fractionated through a packed fractionating column two feet long.

During the course of the run (2 hours), a mixture containing 1.33 moles of the dichlorobutene boiling at 111 to 112° C. and 0.72 mole of 2,2,3-trichlorobutane was passed through the preheater and reactor as described above. There were isolated from the crude reaction product 0.24 mole of monomeric 2-chlorobutadiene-1,3, 1.46 moles of dichlorobutene and 0.33 mole of 2,2,3-trichlorobutane. The monomeric 2-chlorobutadiene-1,3 isolated corresponded to a yield of 80.5% based upon the unrecovered dichlorobutene and trichlorobutane.

Good results have been obtained in runs similar to the above wherein unconverted chlorides have been separated, e. g. by fractional condensation methods, from the mixed products from the reactor and returned to the vaporizer for recycling through the reactor. Operation in such manner is preferred in order to obtain as high a conversion as possible of the starting material to 2-chlorobutadiene-1,3.

The above example illustrates the use of a copper tube, the surfaces of which have been found to catalyze the pyrolysis reaction. Instead of using metallic copper as catalyst, various copper compounds may be used with success. For example, cuprous and cupric chlorides are effective for this purpose as are also cuprous and cupric oxides. Also, instead of using a mixture of the dichlorobutene boiling at 111 to 112° C. and 2,2,3-trichlorobutane, either of those compounds or the dichlorobutene boiling at 130 to 131° C. may be used with equally good results as may also mixtures of two or more of the compounds.

The present method is well suited for practice on a commercial scale inasmuch as it is simple and results in good yields of the desired product. The fact that no substantial amounts of monochlorobutadienes other than 2-chlorobutadiene-1,3 result from the process is particularly advantageous in that it is possible to obtain the desired product in substantially pure form without employing elaborate purifying methods. It may be desirable in the normal operation of the process on a commercial scale to add small amounts of a material such as an amine or phenol, which material is effective in inhibiting polymerization of 2-chlorobutadiene-1,3.

The product obtained by the present method may be polymerized to produce various useful rubber-like materials. The present method may be practiced employing reaction tubes of various materials such as glass, iron, nickel, stainless steel and the like, and open or packed tubes may be suitable depending upon the particular catalyst employed. If copper compounds are used, they may be conveniently carried by various catalyst supporting materials or if metallic copper is used, a copper tube reactor will give good results although it is within the scope of this invention to employ a reactor tube of material other than copper, using a metallic copper packing material in said tube. Operation of the method at atmospheric pressure is convenient although pressures either above or below atmospheric pressure may be used with success.

As many different modifications of the present invention may be practiced without departing from the spirit and scope thereof, it is to be understood that the invention is not to be limited by the foregoing description and example, which are intended merely to be illustrative and not restrictive, except as indicated in the appended claims.

I claim:

1. A method of preparing 2-chlorobutadiene-1,3 comprising subjecting 2,2,3-trichlorobutane to vapor phase pyrolysis at a temperature of 300 to 600° C. in the presence of a substance selected from the group consisting of copper and copper compounds.

2. A method of preparing 2-chlorobutadiene-1,3 comprising subjecting 2,2,3-trichlorobutane to vapor phase pyrolysis at a temperature of 470 to 520° C. in the presence of a substance selected from the group consisting of copper and copper compounds.

3. A method of preparing 2-chlorobutadiene-1,3 comprising subjecting the mixed product obtained by chlorinating 2-chlorobutene-2 to vapor phase pyrolysis in the presence of a substance selected from the group consisting of metallic copper and copper compounds at a temperature of 300 to 600° C.

OLIVER W. CASS.

REFERENCES CITED

The following references are of record in the file of this patent:

UNITED STATES PATENTS

| Number | Name | Date |
|---|---|---|
| 2,038,538 | Carothers | Apr. 28, 1936 |
| 2,180,115 | Lange et al. | Nov. 14, 1939 |

OTHER REFERENCES

"Chemical Abstracts," vol. 31, 1937, col. 2580 (Abstract of article by Klebanskii et al. in Jour. Applied Chem. U. S. S. R., vol. 9, 1936, pages 1985–93).